United States Patent [19]

Melindo

[11] Patent Number: 4,845,702
[45] Date of Patent: Jul. 4, 1989

[54] OPTICAL TELECOMMUNICATION PACKAGE SWITCHING SYSTEM USING ASYNCHRONOUS TECHNIQUES

[75] Inventor: Flavio Melindo, Turin, Italy

[73] Assignee: CSELT - Centro Studi e Laboratori Telecomunicazioni SpA, Turin, Italy

[21] Appl. No.: 159,215

[22] Filed: Feb. 23, 1988

[30] Foreign Application Priority Data

Mar. 12, 1987 [IT] Italy ................ 67187 A/87

[51] Int. Cl.$^4$ ............................................. H04B 9/00
[52] U.S. Cl. .......................................... 370/1; 370/4; 455/600; 455/612
[58] Field of Search ............... 455/606, 607, 612, 616, 455/617, 619, 600; 370/1, 34

[56] References Cited

U.S. PATENT DOCUMENTS

| | | | |
|---|---|---|---|
| 4,397,016 | 8/1983 | Broussaud | 370/4 |
| 4,408,307 | 10/1983 | Harris | 455/606 |
| 4,506,387 | 3/1985 | Walter | 455/612 |
| 4,736,462 | 4/1988 | Joel | 455/600 |

OTHER PUBLICATIONS

"ATD Switching Networks", from Proceedings of GSLB-Seminar on Broadband Switching-Albufeira, Portugal, 19-20 Jan. 1987, pp. 225-234.
"Survey of Optical Switching", pp. 143-151.
"High-Speed Optical Time-Division and Space-Division Switching".
Telephony, 3-17-86, Economie FO System for New Residence Service, Hightower, pp. 44-45.

*Primary Examiner*—Robert L. Griffin
*Assistant Examiner*—Leslie Van Beek
*Attorney, Agent, or Firm*—Herbert Dubno

[57] ABSTRACT

An optical switching system, wherein the input channels carrying packetized data are switched one-by-one at high bit rate to output channels through an optical switching network. The packets of a generic input channel are time compressed, converted into optical signals and, at suitable instants, sent to an optical switching network to be switched to the desired output channel, they are then reconverted into electrical signals and expanded to their original duration. A centralized processor controls the channel switching through the switching network by means of a driving circuit.

5 Claims, 3 Drawing Sheets

OPTICAL TELECOMMUNICATION PACKAGE SWITCHING SYSTEM USING ASYNCHRONOUS TECHNIQUES

FIELD OF THE INVENTION

My present invention relates to telecommunications systems using digital signals organized into information blocks or so-called "packets" and, more particularly, to an optical switching system for telecommunications packet-switching purposes.

BACKGROUND OF THE INVENTION

Among various techniques which are presently under test for implementing broadband telecommunications networks, asynchronous time division (ATD) techniques are of particular interest, since ATD systems are the only networks, which, at least from a theoretical point of view, can integrate more services at different speed by a single technique. Since this technique is based upon the switching of packets with a destination label, it is also referred to as "Fast Packet Switching" or "Label Addressed Switching" technique.

Highly promising networks allowing the use of label addressed switching techniques, are described in the paper entitled "*ATD Switching Networks*" from Proceedings of GSLB-Seminar on Broadband Switching - Albufeira, Portugal, Jan. 19-20, 1987, pages 225-234.

Such networks are based on small-sized switching elements (typically 2×2), organized so that the packet is self-routing through the network; each stage need examine only one bit of the label, deciding on the basis of its examined value to which of the two outputs the packet is to be forwarded.

Since a network of this type is typically blocking, each network node needs a buffer memory, where the packet can wait when its destination output has been seized by the other input. As a consequence, the network is not time-transparent and its efficacy is higher if the entering traffic is randomly distributed and the ratio between presence and absence times of the signal is low. By current technologies (C-MOS) and 8 channels in parallel the global throughput of a 128×128 network can be a few Gbit/s.

Throughput can be increased by other technologies: an increase of an order of magnitude can for instance be obtained by ECL. An alternative can be the optical technology. However, from the switching point of view, the latter technology offers the systemist rather limited performance: matrices with a small number of inputs and outputs (8×8 is considered significant), but with rather large size (a few cm); high input/output attenuation (some dB) and high crosstalk (few tens of dB).

The most promising devices for the optical switching commercially available nowadays are based on directional couplers or on X-junctions, generally obtained by diffusing titanium optical guides in a substrate of lithium niobate.

Devices with X junctions are described in the paper entitled "*Survey of Optical Switching*", at pages 143-151 of the previously-cited Proceedings and directional couplers are described in the paper entitled "*High Speed Optical Time-division and Space-division Switching*" issued in the Proceedings of IOOC-ECOC 85, Venice, Oct. 1-4, 1985, pages 81-88.

Nowadays, devices of this type can allow limited-capacity matrices to be implemented (e.g. 12×12 with directional couplers, 16×16 with X-junctions). The X-junction seems to be better adapted to matrix organization, since it has no bending losses, but needs higher driving voltage.

The reduced performances of these elements are compensated for by a very large bandwidth (some tens of GHz) and a quasi-infinitesimal switching time (some tens of ps). These characteristics make interesting the use of optical elements in switching networks wherein having a normally small size and wherein the bandwidth can be used to increase the ratio between presence and absence times of the signal.

So far neither optical logic devices (to be used for selfrouting functions in the network) nor optical memory elements of practical utility are available. Hence with this background it would not seem that in the near future optical switching elements would be used as in electrical technology.

OBJECT OF THE INVENTION

It is therefore the principal object of the invention to provide a switching network based on the optical asynchronous technique which avoids the aforementioned drawbacks and has a system organization which carries out the logic functions in the network periphery and does not require memory elements inside the network.

SUMMARY OF THE INVENTION

The optical switching system of the invention solves these problems by providing high-speed packet-switching using a switching network consisting of an optical device. Negative crosstalk effects are eliminated and the network is easy to implement.

This optical switching system of the invention comprises input channels carrying packetized data switched one-by-one to output channels. According to the invention, the packets of a generic input channel are compressed by time compressors, are converted into optical signals and, at suitable instants, are sent to an optical switching network to be switched to the desired output channel, they are then reconverted into electrical signals and expanded by time expanders to their original duration, so as to form the output channel, the switching of input channels to output channels being controlled by a centralized processor which controls the switching network through a driving circuit.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
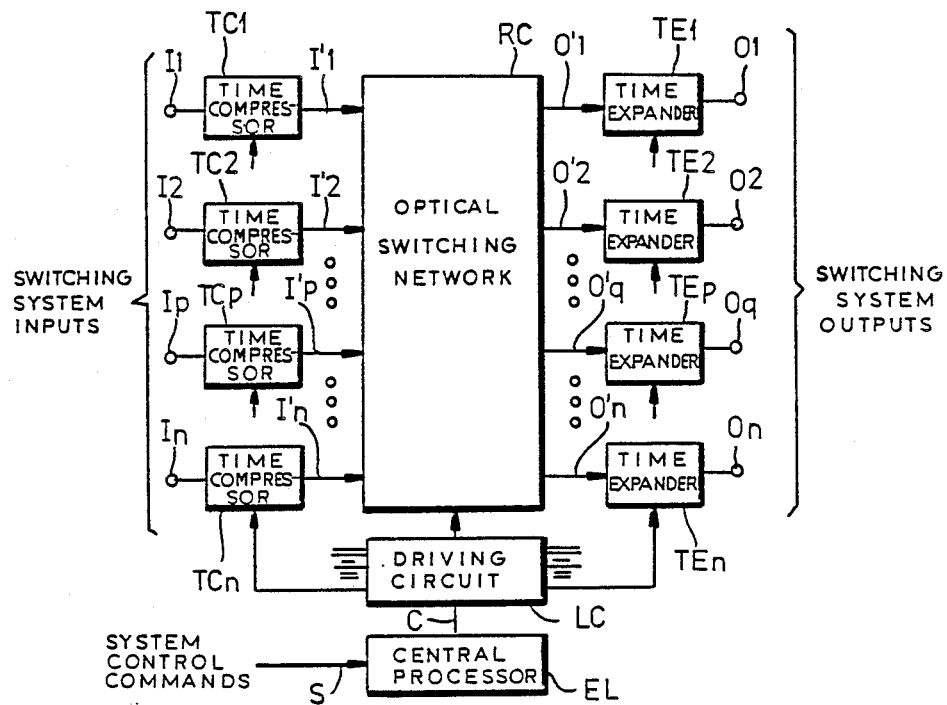
FIG. 1 is a block diagram of the switching system.

In the block diagram of FIG. 1 reference characters I1, I2, ... Ip ... In and O1, O2, ... Oq ... On denote input and outputs of the switching system.

The system comprises time compressors TC1, TC2, ... TCp ... TCn and time expanders TE1, TE2, ... TEq ... TEn, as well as an optical switching network RC. Each block has a connection with a driving circuit LC, slaved through connection C to a centralized processor EL. The processor obtains information necessary to the system control through connection S, arriving from circuits devoted to signalling.

Figure 2:
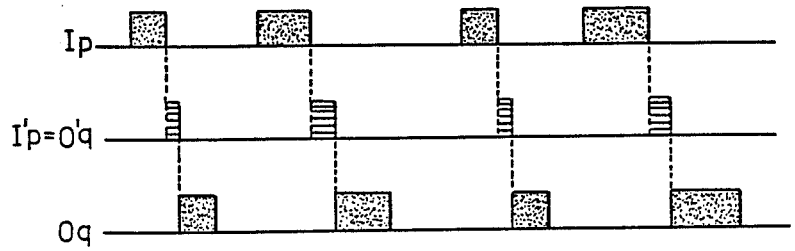
FIG. 2 is a set of time diagrams of the digital signals present at some points of the system.

Let us suppose the generic input Ip activity to be as represented in FIG. 2, diagram Ip: namely data blocks with random arrival instants and variable durations. In this case, the probability that the duration will exceed a certain value can exponentially decrease. The time compressor TCp function involves receiving the data block and emitting it in shorter time, as indicated in diagram I'p=O'q of FIG. 2; the inverse operation is performed by the time expander TEq, whose input O'q is connected to output I'p of TCp through the optical switching network RC (FIG. 1). The switching network, compressors and expanders are driven by driving circuit LC, controlled by the centralized processor EL.

The blocks re-expanded by TEq are shown in the diagram Oq of FIG. 2.

Let us suppose that the capacity of network RC is infinite and the degree of compression or expansion is unlimited: it can be stated that by increasing the degree of time compression, the probability of transit through the network of two packets at the same time can be reduced at will. Practically, however, there is a lower limit to such a probability, determined by the physical limits of the apparatus.

However, if time compressors provide also temporary-storage capability, when the network is already occupied by a data block, the other data blocks can be delayed for the necessary time. This poses no problem, since system time transparency is neither ensured, nor required. Under these conditions the network does not require storage capability in its switching elements.

Figure 3:
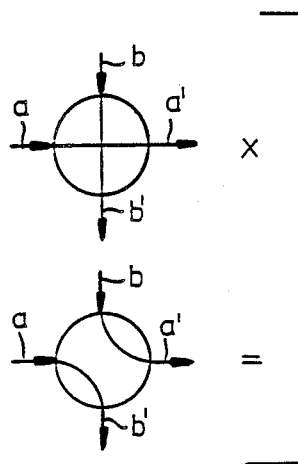
FIG. 3 is a diagram which schematically represents a number of possible states of switching elements.

A network of this type can consist of elements capable of assuming two configurations, indicated by symbols "x" and "=" in FIG. 3.

In the "x" state the two flows directly transit without interfering with each other from inputs a and b to outputs a' and b' respectively; in the "=" state the outputs interchange with each other, hence inputs a and b are connected to outputs b' and a' respectively.

Figure 4:
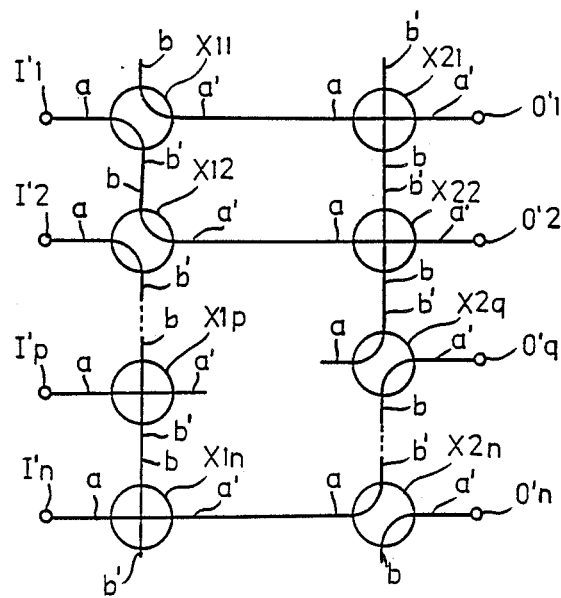
FIG. 4 is block diagram of the switching network.

A network with n inputs and n outputs (i.e. an n×n network) is represented in FIG. 4. It can consist in two columns including n switching elements each.

References X11, X12, ... X1p ..., X1n indicate the first column elements and X21, X22, ... X2q ..., X2n indicate the second first column elements.

The n inputs I'1, I'2, ... I'p ..., I'n are connected to inputs a of n elements of the first column and the n outputs O'1, O'2, ... O'q ... ,O'n are connected to outputs a' of n elements of the second column. Outputs a' of the elements of the first column are connected to the corresponding inputs a of elements of the second column, while per each column each output b' is connected to the input b of the adjacent element.

It is finally to be noted that the elements of the second column are inverted with respect to those of the first column.

The theoretical network capacity is at last equal to the capacity of the unique connection available, used without idle periods: 10 Gbit/s can be achieved with optical components.

Routing is performed one packet at a time with very simple rules, examining input and output indices contained in the label of the packet present at that input. If at input I'p is present a packet with output O'q, routing strategy is reduced to three cases only:

(a) p<q: points X1p and X1q are activated;
(b) p>q: points X2p and X2q are activated;
(c) p=q: no point is activated.

After establishing the internal circuitry, high-speed packet transmission in the network is then enabled. Another connection is examined afterwards.

Even though in the present embodiment no contemporaneous connections are possible, FIG. 4 shows for better clarity two connections between inputs and outputs with different order numbers: namely with input order number less than the output order number (I'1-O'2) and with input order number greater than the output order number (I'n-O'q).

Figure 5:
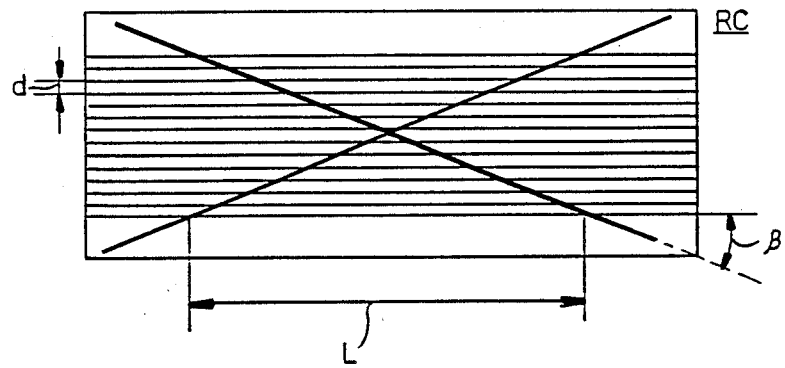
FIG. 5 is an elevational view of a substrate supporting the optical switching network.

Such a switching network can be implemented in optical technology using switching elements consisting of x junctions, which can be placed side by side on the same substrate, having the structure of FIG. 5.

A number n of optical parallel guides is obtained in a substrate of suitable material, e.g. by diffusing titanium in lithium niobate ($LiNbO_3$). Two more guides are provided in the same way on the n parallel guides at an angle equal to $\beta$ and an angle equal to $180-\beta$ and hence on each crosspoint metallic electrodes are deposited for applying the electrical field controlling the junction.

If angle $\beta$ is small enough, $L = n.d/\beta$, where L is minimal length of parallel optical guides, d their distance and n their number, i.e. the number of input/output lines. With L=100 mm, d=50 $\mu$m, and $\beta$=0.0174 rad (1°), n is equal to 34. The distance between two following crosspoints, necessary to deposit driving electrodes, is 2.8 mm. It is worth noting that if a 100-input-/output network is desired having the same physical size as that substrate, a crossing angle of 0.05 rad (2.86°), with the electrodes interspaced by 1 mm would be necessary. These values are not compatible with the characteristics of $LiNbO_3$, but clearly are within the scope of modern optical material developments.

Suppose A(1) is linear guide attenuation, A(x) the attenuation of the switch element in "x" state and A(=) that in "=" state, if n is the number of inputs/outputs and L the guide length, the maximum attenuation A through the network is equal to:

$$A = 2.A(=) + (n-1).A(x) + L.A(1)$$

For the previously mentioned case (L=100 mm, n=30), if we suppose A(1)=0.02 dB/mm, A(x)=0.15 dB and A(=)=0.5 dB, we obtain:

$$A = 2.0.5 + 29.0.15 + 100.0.02 = 7.35 \text{ dB}$$

Crosstalk at the output with the same index as the input is due to the loss of a unique X-junction in "=" state, at the other outputs it still depends on a unique junction in "x" state. A crosstalk of 25 dB, easy to discriminate from the signal, is technologically attainable for the single junction.

Figure 6:
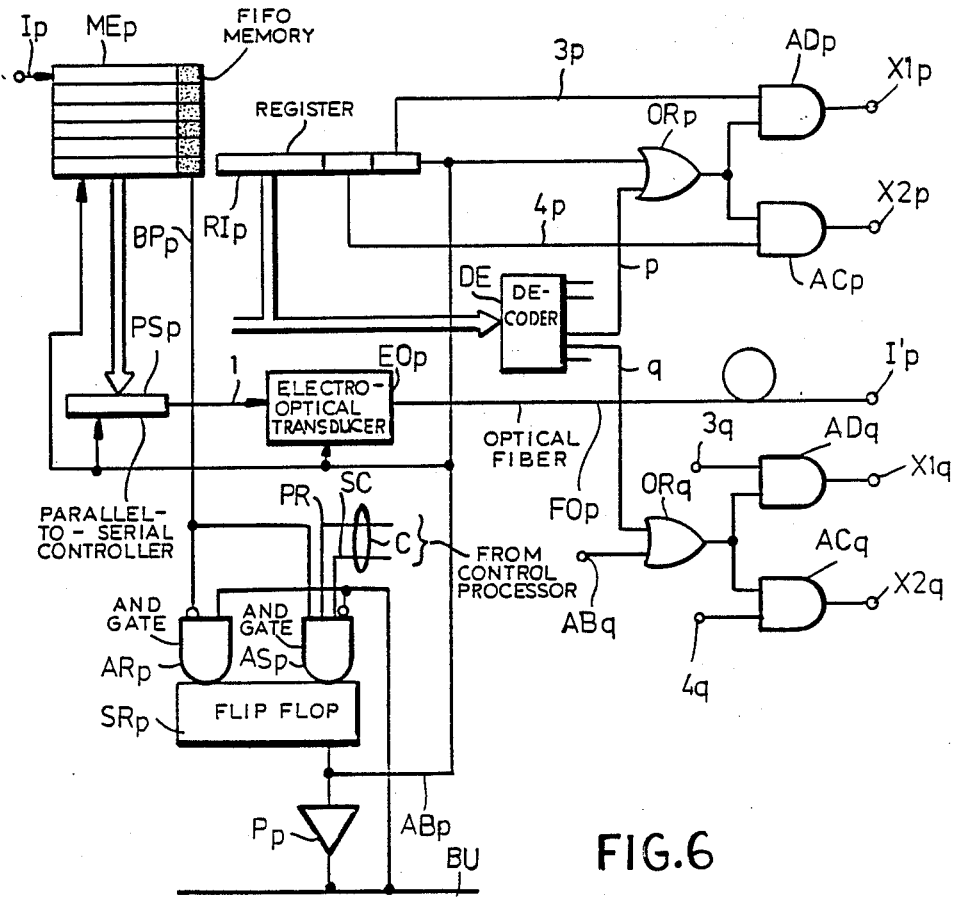
FIG. 6 is an electrical block diagram of the switching network driving circuit.

The block diagram of a driving circuit for the switching network above is shown in FIG. 6. It comprises the main blocks forming time compressors and the driving circuit LC of FIG. 1.

It assigns common resources and prevents the contemporaneous access of more input signals. This method can be more or less sophisticated, adopting e.g. collision-detection multiple-access techniques or cyclic-priority systems; however, for speed and simplicity of construction a simple scanning method is preferred.

Data packets consisting of a variable number of octets arrive in sequence at the generic serial input Ip of FIG. 6. Under the control of a centralized processor, each octet is written in the register of a FIFO (First-In First-Out) memory MEp, adding a bit in the presence of datum in a suitable cell of each register. Said cells are represented in dashed lines in the FIGURE. In correspondence with the writing of the last octet of the data packet, the signal on wire PR, belonging to connection C, is activated by the centralized processor.

A parallel-to-serial convertor PSp, placed at the output of memory MEp, transforms the octets in parallel received from the memory MEp into a serial signal with high bit-rate, which can be sent onto wire 1 to electro-optical transducer EOp. An optical fiber FOp is connected to EOp output and to the corresponding input of the already-described optical switching network.

A periodical scanning signal is sent by the processor through connection C to wire SC, connected to input SET of a SET-RESET flip-flop SRp through a four-input AND gate ASp. This signal has a period dependent on the desired transfer speed through the switching network and is phase-shifted with respect to the analogous scanning signals of the other n-1 channels by a time equal to the period divided by n.

Wire BU, common to all the channels, carries a signal meaning "busy switching network" when in active state. If this signal is inactive, at the end of packet writing (active signal on wire PR) and in correspondence with the suitable time phase (active scanning signal on wire SC), the input SET of the flip-flop is enabled and its output passes to the active state. Through gate Pp also the signal on wire BU becomes active (busy switching network), to inhibit all the inputs SET of the other n-1 flip-flops and of the same flip-flop SRp are inhibited, while RESET inputs are enabled.

The signal on wire ABp, connected to the output of flip-flop SRp, enables in this phase the transfer of the octets from MEp, the parallel-to-serial conversion in PSp and the electro-optical conversion by EOp, which emits then a corresponding high bit-rate optical packet. The signal on wire ABp enables also the outputs of a register RIp, wherein the centralized processor has written the destination address of the channel and two bits whose active states have the meaning of p>q and p<q, q being the order number of the output Oq.

A decoder DE, common to all the channels, reads the destination address supplied by register RIp on connection 2 and puts in the active state a suitable signal on one of the n output wires. In this case, the active wire will be the q-th, so that the combinational circuit consisting of ORq, ADq and ACq, relative to the output, will be activated, while the combinational circuit consisting of ORp, ADp and ACp, relative to the input, will be activated by the signal on wire ABp. According to whether at register RIp output the condition is p<q, p>q or p=q condition on wires 3p and 4p, either gate ADp, or ACp or neither are activated, and hence through wires X1p or X2p the respective elements of the optical switching network are activated. The same applies to output gates ADq and ACq alternatively activated by signals on wires 3q and 4q, thus through wires X1q or X2q also the output switch elements are activated.

When all the octets and corresponding presence bits have left memory MEp, the signal on wire BPp passes to inactive state, therefore the input RESET of flip-flop SRp is activated through gate ARp and the signal indicating the switching network availability appears on wire BU.

With reference to block diagram of FIG. 1, blocks TCp can be taken as consisting of blocks MEp, PSp, EOp and of optical fiber FOp of FIG. 6, while all the other blocks of FIG. 6 can be taken as housed in driving circuit LC of FIG. 1.

Expanders TEq are easily made with circuits performing the operations inverse to those performed in the compressors.

At the output of the switching network there is an optical fiber, connected to an opto-electrical transducer, followed by a serial-to-parallel convertor and by a FIFO memory, which will supply again a packet flow with the same characteristics as the input one.

Flip-Flop SRp (FIG. 6) still provides enabling on wire ABp.

It is clear that what has been described has been given only by way of non-limiting example. Variations and modifications are possible without departing from the scope of the present claims.

I claim:

1. An optical switching system, comprising:
   a multiplicity of input channels receiving packetized data to be switched packet-by-packet to a multiplicity of output channels;
   respective time compressors connected to said input channels;
   means for converting electrical signals at outputs of said time compressors into respective optical signals;
   an optical switching network receiving said optical signals corresponding to the electrical signals at the outputs of said time compressors for switching said optical signals to respective optical outputs of said switching network, each assigned to a respective one of said optical channels;
   means for converting optical signals appearing at each of said optical outputs into respective output electrical signals assigned to each of said output channels;
   a respective time expander connected to receive each of said output electrical signals for expanding it to a duration corresponding to the duration of the original packet switched to the said output channel, whereby an output of each time expander forms the respective output channel; and
   a driving circuit connected to said optical switching network and controlled by a centralized processor for controlling said optical switching network to switch the optical signals corresponding to each packet at a respective time compressor to the respective optical output and the corresponding output channel,
   said optical switching network comprising a plurality of parallel optical guides crossed by two guides forming a small angle ($\beta$) and an angle ($180° - \beta$) supplementary to the said small angle with the parallel guides, crosspoints of said guides being provided with electrode pairs to which a voltage difference is applied to generate an electrical field for the deviation of the light signal from the parallel guides to the crossing guides and from the crossing guides to the parallel guides, said time compressors each comprise a FIFO memory wherein octets forming said packets are progressively stored at their arrival together with a presence bit and at suitable instants are sent to a parallel-to-serial converter to be transformed into serial packets at high bit-rate and then to be transformed into optical packets by an electro-optical transducer and sent through an optical fiber to the switching network;

said driving circuit comprising a decoder for decoding packet destination address and comprises for each input channel a SET RESET flip-flop whose reset input is enabled by octet absence in said FIFO memory, through said presence bit, and by a signal with the meaning of a busy switching network, while the set input is enabled by octet presence in the memory, by a signal of packet writing end in the memory, supplied by said centralized processor, by a scanning periodic signal with a period dependent on the desired transfer speed, and by the absence of the signal with the meaning of the busy switching network, the signal at the output of this flip-flop being used to enable an associated time compressor and time expander;

a gate whose input is connected to the flip-flop output and whose output drives a line on which a signal relevant to switching network availability is present;

a register, which stores destination addresses of the packets forming the input channel and two bits with the meaning of order number of the input channel greater than that of the output one and vice versa under the control of said centralized processor, the transfer to the output of said data being enabled by the signal at the output of the flip-flop; and a combinational circuit having two outputs are alternatively active as a function of the two bits with the meaning of order number of the input channel greater or smaller than that of the output one when enabled by the signal at the output of the flip-flop or when enabled by the signal supplied by said decoder, one of the two outputs of the combinational circuit being used to drive an electrode pair of said switching network, said time expanders each having an optical fiber connected to the switching network wherefrom high bit-rate packets are extracted for an opto-electrical transducer, which sends them to a serial-to-parallel converter apt to drive a FIFO memory, wherefrom the orignal packetized signal is extracted, the optoelectrical transducer, the serial-to-parallel converter and the FIFO memory being enabled by a signal supplied by said flip-flop.

2. An optical switching system, comprising:
a multiplicity of input channels receiving packetized data to be switched packet-by-packet to a multiplicity of output channels;
respective time compressors connected to said input channels;
means for converting electrical signals at outputs of said time compressors into respective optical signals;
an optical switching network receiving said optical signals corresponding to the electrical signals at the outputs of said time compressors for switching said optical signals to respective optical outputs of said switching network, each assigned to a respective one of said optical channels;
means for converting optical signals appearing at each of said optical outputs into respective output electrical signals assigned to each of said output channels;
a respective time expander connected to receive each of said output electrical signals for expanding it to a duration corresponding to the duration of the original packet switched to the said output channel, whereby an output of each time expander forms the respective output channel; and
a driving circuit connected to said optical switching network and controlled by a centralized processor for controlling said optical switching network to switch the optical signals corresponding to each packet at a respective time compressor to the respective optical output and the corresponding output channel,
said optical switching network comprising a plurality of parallel optical guides crossed by two guides forming a small angle ($\beta$) and an angle ($180° - \beta$) supplementary to the said small angle with the parallel guides, crosspoints of said guides being provided with electrode pairs to which a voltage difference is applied to generate an electrical field for the deviation of the light signal form the parallel guides to the crossing guides and from the crossing guides to the parallel guides.

3. An optical switching system, comprising:
a multiplicity of input channels receiving packetized data to be switched packet-by-packet to a multiplicity of output channels;
respective time compressors connected to said input channels;
means for converting electrical signals at outputs of said time compressors into respective optical signals;
an optical switching network receiving said optical signals corresponding to the electrical signals at the outputs of said time compressors for switching said optical signals to respective optical outputs of said switching network, each assigned to a respective one of said optical channels;
means for converting optical signals appearing at each of said optical outputs into respective output electrical signals assigned to each of said output channels;
a respective time expander connected to receive each of said output electrical signals for expanding it to a duration corresponding to the duration of the original packet switched to the said output channel, whereby an output of each time expander forms the respective output channel; and
a driving circuit connected to said optical switching network and controlled by a centralized processor for controlling said optical switching network to switch the optical signals corresponding to each packet at a respective time compressor to the respective optical output and the corresponding output channel, said time compressors each comprising a FIFO memory wherein octets forming said packets are progressively stored at their arrival together with a presence bit and at suitable instants are sent to a parallel-to-serial converter to be transformed into serial packets at high bit-rate and then to be transformed into optical packets by an electro-optical transducer and sent through an optical fiber to the switching network.

4. An optical switching system, comprising;
a multiplicity of input channels receiving packetized data to be switched pack-by-packet to a multiplicity of output channels,
respective time compressors connected to said input channels;
means for converting electrical signals at outputs of said time compressors into respective optical signals;
an optical switching network receiving said optical signals corresponding to the electrical signals at the outputs of said time compressors for switching said optical signals to respective optical outputs of said switching network, each assigned to a respective one of said optical channels;
means for converting optical signals appearing at each of said optical outputs into respective output electrical signals assigned to each of said output channels;
a respective time expander connected to receive each of said output electrical signals for expanding it to a duration corresponding to the duration of the original packet switched to the said output channel, whereby an output of each time expander forms the respective output channel; and
a driving circuit connected to said optical switching network and controlled by a centralized processor for controlling said optical switching network to switch the optical signals corresponding to each packet at a respective time compressor to the respective optical output and the corresponding output channel, said driving circuit comprising a decoder for decoding packet destination address and comprises for each input channel,
a SET RESET flip-flop whose reset input is enabled by octet absence in said FIFO memory through said presence bit, and by a signal with the meaning of a busy switching network, while the set input is enabled by octet presence in the memory, by a signal of packet writing end in the memory, supplied by said centralized processor, by a scanning periodic signal with a period dependent on the desired transfer speed, and by the absence of the signal with the meaning of the busy switching network, the signal at the output of this flip flop being used to enable an associated time compressor and time expander;
a gate whose input is connected to the flip-flop output and whose output drives a line on which a signal relevant to switching network availability is present;
a register, which stores destination addresses of the packets forming the input channel and two bits with the meaning of order number of the input channel greater than that of the output one and vice versa under the control of said centralized processor, the transfer to the output of said data being enabled by the signal at the output of the flip-flop; and
a combinational circuit having two outputs are alternatively active as a function of the two bits with the meaning of order number of the input channel greater or smaller than that of the output one when enabled by the signal at the output of the flip-flop or when enabled by the signal supplied by said decoder, one of the two outputs of the combinational circuit being used to drive an electrode pair of said switching network.

5. An optical switching system, comprising:
a multiplicity of input channels receiving packetized data to be switched packet-by-packet to a multiplicity of output channels;
respective time compressors connected to said input channels;
means for converting electrical signals at outputs of said time compressors into respective optical signals;
an optical switching network receiving said optical signals corresponding to the electrical signals at the outputs of said time compressors for switching said optical signals to respective optical outputs of said switching network, each assigned to a respective one of said optical channels;
means for converting optical signals appearing at each of said optical outputs into respective output electrical signals assigned to each of said output channels;
a respective time expander connected to receive each of said output electrical signals for expanding it to a duration corresponding to the duration of the original packet switched to the said output channel, whereby an output of each time expander forms the respective output channel; and
a driving circuit connected to said optical switching network and controlled by a centralized processor for controlling said optical switching network to switch the optical signals corresponding to each packet at a respective time compressor to the respective optical output and the corresponding output channel, wherein said time expanders each having an optical fiber connected to the switching network wherefrom high bit-rate packets are extracted for an opto-electrical transducer, which send them to a serial-to-parallel converter apt to drive a FIFO memory, wherefrom the original packetized signal is extracted, the opto-electrical transducer, the serial-to-parallel converter and the FIFO memory being enabled by a signal supplied by said flip-flop.

* * * * *